US009591736B2

(12) United States Patent
Molz

(10) Patent No.: US 9,591,736 B2
(45) Date of Patent: Mar. 7, 2017

(54) CLOSED LOOP COOLING OF A PLASMA GUN TO IMPROVE HARDWARE LIFE

(75) Inventor: Ronald J. Molz, Mt. Kisco, NY (US)

(73) Assignee: OERLIKON METCO (US) INC., Westbury, NY (US)

( * ) Notice: Subject to any disclaimer, the term of this patent is extended or adjusted under 35 U.S.C. 154(b) by 182 days.

(21) Appl. No.: 14/361,917

(22) PCT Filed: Jan. 27, 2012

(86) PCT No.: PCT/US2012/022897
§ 371 (c)(1), (2), (4) Date: May 30, 2014

(87) PCT Pub. No.: WO2013/112177
PCT Pub. Date: Aug. 1, 2013

(65) Prior Publication Data
US 2014/0332177 A1 Nov. 13, 2014

(51) Int. Cl.
*B23K 10/00* (2006.01)
*H05H 1/28* (2006.01)
*F28F 27/02* (2006.01)

(52) U.S. Cl.
CPC ............... *H05H 1/28* (2013.01); *F28F 27/02* (2013.01)

(58) Field of Classification Search
CPC .... H05H 1/28; H05H 1/34; H05H 1/26; F28F 27/02
See application file for complete search history.

(56) References Cited

U.S. PATENT DOCUMENTS 3,731,047 A * 5/1973 Mullen .................... H05H 1/30 219/121.45
4,780,591 A 10/1988 Bernecki et al.
5,247,152 A * 9/1993 Blankenship ............ H05H 1/28 219/121.48
5,807,407 A * 9/1998 England .............. A61F 2/30767 128/898
(Continued)

FOREIGN PATENT DOCUMENTS

JP 11-309575 11/1999
WO 96/08126 3/1996
WO 2008/096454 8/2008

OTHER PUBLICATIONS

English translation of Japan Office Action conducted in counterpart Japan Appln. No. 2014-554701 (Jun. 10, 2016).
(Continued)

*Primary Examiner* — Mark Paschall
(74) *Attorney, Agent, or Firm* — Greenblum & Bernstein, P.L.C.

(57) ABSTRACT

Water cooling system (1) for a plasma gun (2), method for cooling a plasma gun (2) and method for increasing a service life of a plasma gun (2). The system (1) includes a water cooler structured and arranged to remove heat from cooling water to be supplied to the plasma gun (2), a controller (7) structured and arranged to monitor a gun voltage of the plasma gun (2), and at least one flow valve (8) coupled to and under control of the controller (7) to adjust a flow of the cooling water. When the gun voltage drops below a predetermined value, the controller (7) controls the at least one flow valve (8) to increase the plasma gun temperature and the gun voltage.

22 Claims, 4 Drawing Sheets

(56) References Cited

U.S. PATENT DOCUMENTS

| | | | | |
|---|---|---|---|---|
| 7,043,933 | B1 | 5/2006 | Knight | |
| 2006/0028145 | A1 * | 2/2006 | Mohamed ................ | H05H 1/24 315/111.21 |
| 2006/0052880 | A1 * | 3/2006 | Brosnahan, III ........ | C23C 30/00 623/23.39 |
| 2007/0122562 | A1 | 5/2007 | Adams | |
| 2008/0093346 | A1 | 4/2008 | Yamaguchi et al. | |
| 2009/0012611 | A1 | 1/2009 | Brosnahan et al. | |
| 2009/0133691 | A1 * | 5/2009 | Yamada ............... | A61M 11/041 128/200.16 |

OTHER PUBLICATIONS

First Japan Office Action conducted in counterpart Japan Appln. No. 2014-554701 (Oct. 28, 2015) (w/ English language translation).

* cited by examiner

CLOSED LOOP COOLING OF A PLASMA GUN TO IMPROVE HARDWARE LIFE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

Embodiments of the invention are directed to a plasma spray gun, and in particular to water cooling of the plasma spray gun.

2. Discussion of Background Information

It is understood in the art that conventional plasma guns used for thermal spraying suffer from voltage decay over time. As a result of this decay in voltage, gun power levels are reduced, which eventually requires gun hardware, e.g., cathode and anode elements, to be replaced. The voltage decay can be attributed to changes within the bore of the anode as the plasma arc eventually creates discontinuities that serve as charge concentrations for arc attachment. As they develop, the discontinuities attract the arc to attach further upstream in the gun bore, thereby reducing the length of the plasma arc, resulting in a voltage drop.

Thus, designers and engineers seek structural arrangements and/or operational processes in plasma guns that would delay or correct for the aforementioned voltage drop in order to achieve longer hardware life, better coating consistency, and cheaper operating costs.

A known process utilized in conventional plasma guns is the use of guiding cooling water through the plasma gun to prevent the material and mechanical breakdowns that can occur through the exceeding high temperatures created by the plasma gun's operation. Cooling water systems in conventional plasma guns utilize a closed loop heat exchanging system in which a cooling water circuit is formed to guide cooling water to portions of the gun requiring cooling and then to channel the water away from those portions of the gun. In these known implementations, the cooling circuit is set to maintain a constant level of cooling to the gun only, i.e., by presetting the water temperature within a range of 15°-18° C. and a specified flow of the cooling circuit.

SUMMARY OF THE EMBODIMENTS

Embodiments of the invention are directed to heat exchanging water cooling circuit in a plasma gun that increases hardware and service life of the plasma gun over that attainable through the above-described known cooling water heat exchanger in conventional plasma guns.

Embodiments of the invention are directed to a water cooling system for a plasma gun. The system includes a water cooler structured and arranged to remove heat from cooling water to be supplied to the plasma gun, a controller structured and arranged to monitor a gun voltage of the plasma gun, and at least one flow valve coupled to and under control of the controller to adjust a flow of the cooling water. When the gun voltage drops below a predetermined value, the controller controls the at least one flow valve to increase the gun temperature and the gun voltage.

According to embodiments, the water cooler can include a heat exchanger and the at least one flow valve can be arranged to adjust the cooling water supplied into the heat exchanger. The controller may control the at least one flow valve to increase the temperature of the cooling water.

In accordance with further embodiments of the present invention, a jam box can supply power to the plasma gun via at least two gun cables, so that the jam box is arranged to receive the cooling water from the water cooler and the gun voltage is determined from the voltage between the gun cables.

Moreover, the water cooler can include at least one of a heat exchanger or a refrigerated cooling circuit and the at least one flow valve can be arranged to adjust the cooling water supplied out of the cooler. The controller may control the at least one flow valve to adjust the flow of cooling water from the cooler.

According to still other embodiments, the water cooler may include a heat exchanger and the at least one flow valve can include a first valve arranged to adjust the cooling water supplied to the heat exchanger and a second valve arranged to adjust the cooling water supplied out of the heat exchanger. The controller can control the first valve to increase the temperature of the cooling water and controls the second valve to decrease the flow of cooling water from the cooler.

In accordance with still other embodiments, the controller can control the flow valve to at least one of increase the temperature of the cooling water and to decrease the flow of cooling water.

Embodiments of the instant invention are directed to a method for cooling a plasma gun. The method includes monitoring a gun voltage of the plasma gun and when the gun voltage decreases to a predetermined value, adjusting a cooling water flow to increase a gun temperature.

According to embodiments, a heat exchanger can be arranged to remove heat from the cooling water, and the method may further include adjusting the cooling water flow supplied into the heat exchanger. Because of the reduced cooling water flow, the heat exchanger increases the temperature of the cooling water.

In accordance with other embodiments of the invention, a jam box can be arranged to supply power to the plasma gun via at least two gun cables, and the method may further include determining the gun voltage from a voltage between the gun cables.

According to still other embodiments, a water cooler can include at least one of a heat exchanger and a refrigerated cooling circuit arranged to remove heat from the cooling water, and the method can further include adjusting the flow of the cooling water supplied out of the cooler.

Moreover, a heat exchanger can be arranged to remove heat from the cooling water, the method can further include adjusting the cooling water supplied to the heat exchanger and adjusting the cooling water supplied out of the heat exchanger. The adjusting of the cooling water supplied to the heat exchanger may increase the temperature of the cooling water and the adjusting of the cooling water supplied out of the heat exchanger may decrease the flow of cooling water from the cooler.

In accordance with other embodiments, the adjusting of the cooling water flow can result in at least one of increasing the temperature of the cooling water and decreasing the flow of cooling water.

According to still other embodiments of invention, the increased gun temperature may increase a gun voltage.

Embodiments of the invention include a method for increasing service life of a plasma gun. The method includes monitoring a gun voltage of the plasma gun, and adjusting a cooling water flow to increase a gun voltage of the plasma gun.

In accordance with still yet other embodiments of the present invention, the adjusting of the cooling water can increase a gun temperature.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The inventors observed that the apparent temperature of the anode bore surface affects the attachment of the plasma arc to the bore. In particular, the inventors found that, as the temperature of the gun bore surface of a conventional plasma gun increases, the plasma arc tends to attach further downstream in the gun bore as there is less of an energy barrier at the boundary layer at the bore walls. Thus, as they discovered that the arc length increases with increasing temperature, the inventors found that the operational voltage of the plasma gun is related to the anode temperature.

Figure 1:
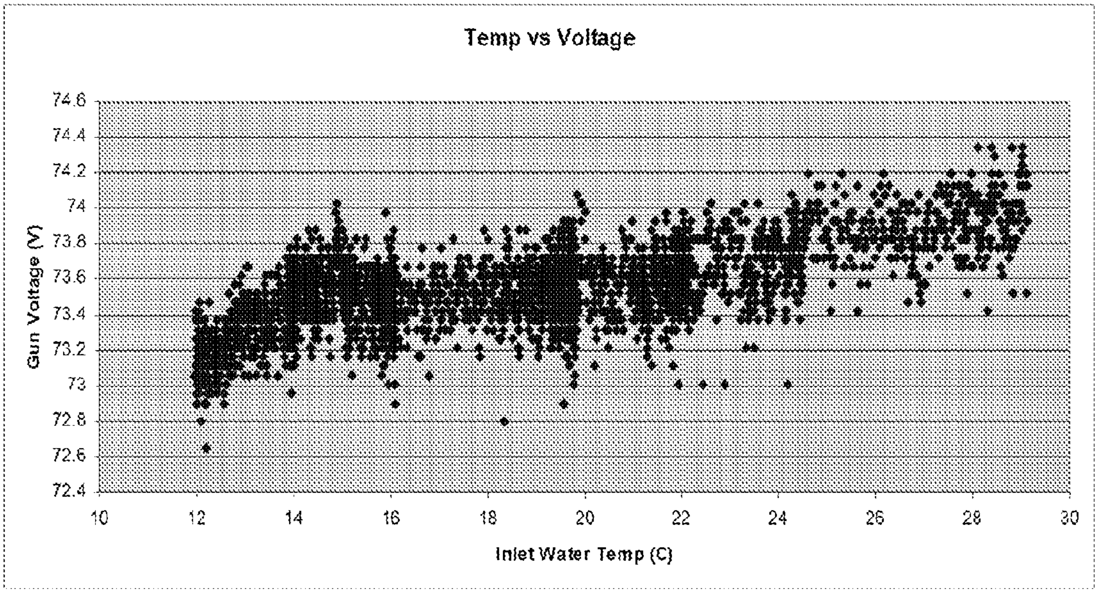
FIG. 1 graphically illustrates the relationship between inlet water temperature and gun voltage.

FIG. 1 shows measurements of gun voltage observed as the gun cooling was changed by altering the inlet water temperature. In particular, the measurements show that by adjusting the temperature of the inlet water between 12°-29° C., the gun voltage can likewise be adjusted by about 1 V. Further, it should be understood that the above-noted range is acceptable in that it does not cause the cooling water to exceed the maximum outlet water temperature.

Figure 2:
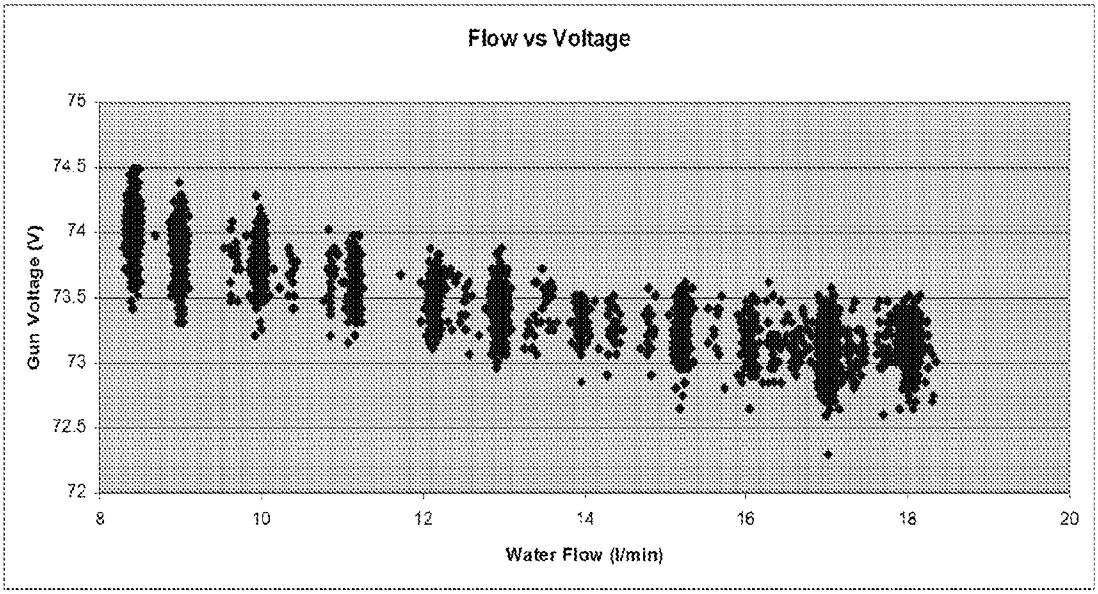
FIG. 2 graphically illustrates the relationship between cooling water flow and gun voltage.

FIG. 2 shows measurements of gun voltage observed as the gun cooling was changed by altering the cooling water flow through the gun. In particular, the measurements show that by adjusting the flow of the cooling water between 9-18 l/min, the gun voltage can likewise be adjusted by about 2 V. Thus, as cooling water flow through the plasma gun decreases, the gun voltage increases.

Figure 3:
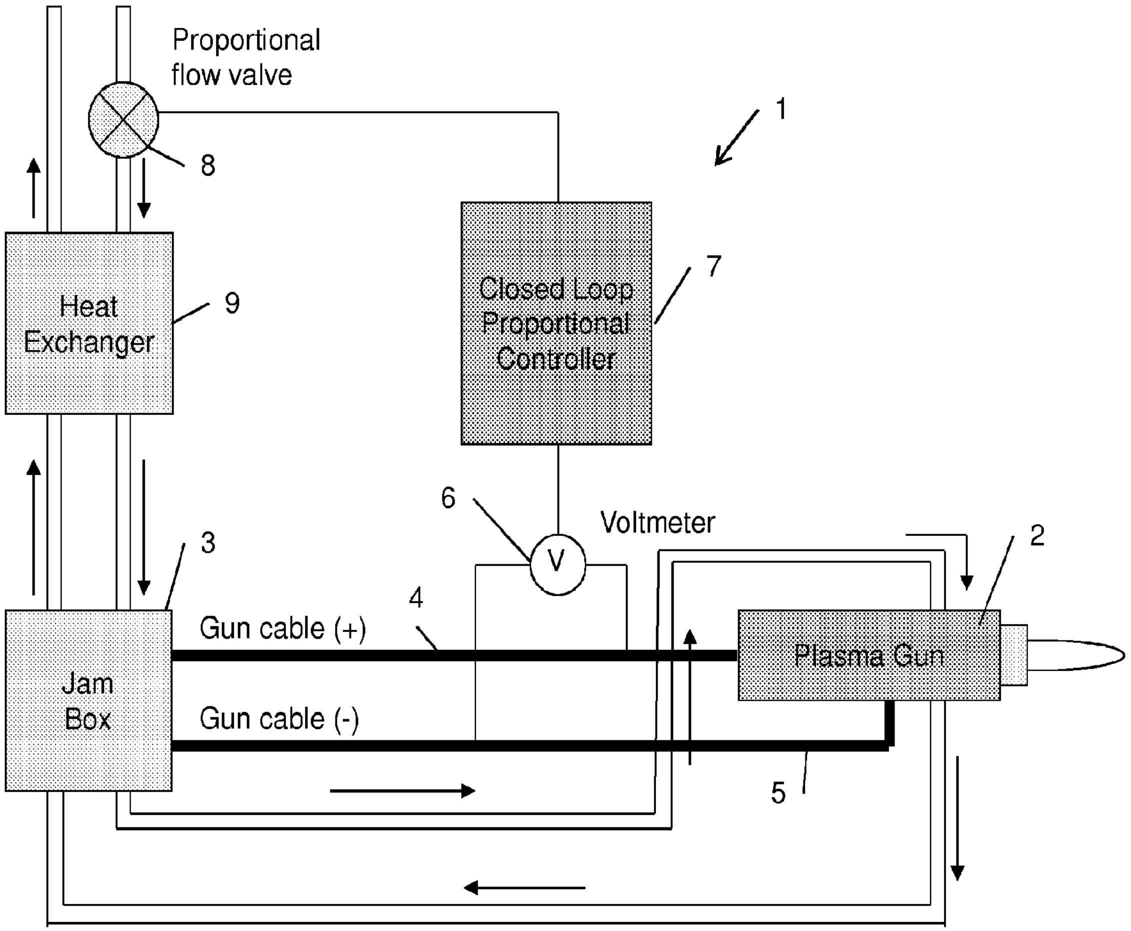
FIG. 3 illustrates an exemplary embodiment of a cooling water supply for a plasma gun.

In view of the foregoing findings, embodiments of the invention include adding a control loop to the cold water circuit to control the gun temperature in order to effect a regulation of the gun voltage. As shown in FIG. 3, a water cooling system 1 is connected to a plasma gun 2. A jam box 3, e.g., a JAM 1030 by Sulzer Metco, can be electrically coupled to plasma gun 2 via gun cables 4 and 5. A voltmeter 6 can be coupled across gun cables 4 and 5 to measure the gun voltage. A closed loop proportional controller 7, which can be of conventional design, receives the measured gun voltage from voltmeter 6 to monitor the gun voltage in accordance with embodiments. By way of non-limiting example, closed loop proportional controller 7 can be preset to maintain a gun voltage of, e.g., 73.4V. As the measured gun voltage values decrease over time as the plasma gun is used, which is normal, closed loop proportional controller 7 controls a proportional flow valve 8, also of conventional design, in order to adjust the cooling inlet water flow to a heat exchanger 9, which can be, e.g., a Climate HE or SM HE. Thus, the supply of cooling water to heat exchanger 9 is controlled via proportional valve 8 to regulate the water temperature from heat exchanger 9 to the jam box 3. The cooled cooling water is supplied to cool jam box 3 and, after passing through jam box 3, the water is returned through heat exchanger 9 to a supply.

In embodiments, as the gun voltage drops during normal use, the control loop can adjust the inlet water temperature to increase the gun temperature. In particular, proportional valve 8 can be closed to increase the water temperature. Thus, when controller 7 determines that the gun voltage (across gun cables 4 and 6) is decreasing, controller 7 controls proportional valve 8 to reduce the flow of cooling water into heat exchanger 9, thereby increasing the water temperature of the cooling water. This increased temperature cooling water is then supplied to jam box 3, which serves as a point where electrical and water are joined to the gun and monitored. The cooling water is then supplied to plasma gun 2, whereby the temperature of plasma gun 2 increases to correspondingly increase the plasma gun voltage (see FIG. 1). As a result, hardware life, as measured by voltage drop, can be extended within the limits that the gun can withstand the higher operating temperatures before damage. These limits are fairly well known already and most control systems have them as part of the safety system. Of course, it is to be understood that the illustrations provided herewith are exemplary in nature and are not intended to be limiting in any manner. Moreover, it is to be understood that the pending illustrations utilize black box representations of specific structure known and available to the ordinarily skilled artisan and that the illustrations presented have been simplified for ease of explanation of the embodiments, such that the illustrated arrangement of water inlet and water outlet to the plasma gun are merely exemplary and not intended as limiting to the described embodiment.

Figure 5:
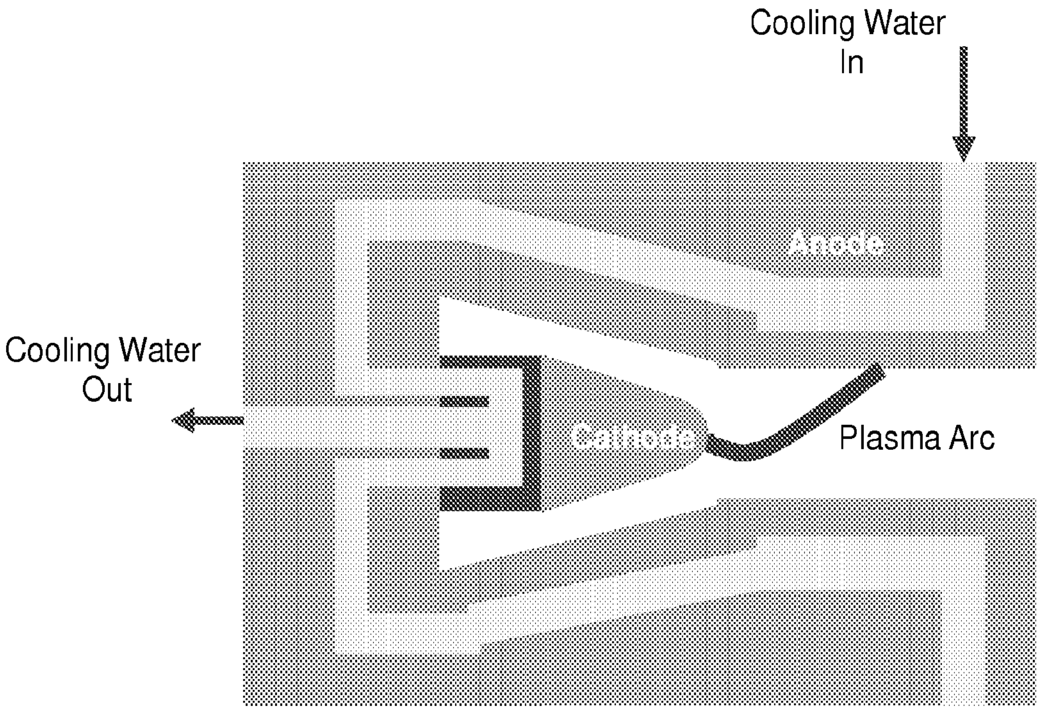
FIG. 5 illustrates a plasma gun with cooling channels.

While the manner in which cooling water flows through the plasma gun differs depending upon the specific plasma gun design, the embodiments of the invention are applicable to all water cooled plasma guns. By way of non-limiting example, FIG. 5 shows an exemplary illustration of water channels formed in a plasma gun for cooling. In the illustrated example, the cooling water can be supplied into and through the anode and then channeled through the gun to the cathode and then out of the gun. It is further noted that the anode can include a plurality of circumferentially spaced channels arranged to receive the cooling water, and these circumferentially spaced channels can extend along the length of the plasma gun to the cathode to provide the desired cooling. It is understood that other plasma gun designs and/or cooling channel designs are possible without departing from the spirit and scope of the embodiments of the invention.

In further embodiments, the inlet and water temperature to/from the plasma gun may also be monitored to ensure that allowable limits for the gun cooling are maintained to prevent the control loop from reaching thermal conditions that could result in gun damage.

Figure 4:
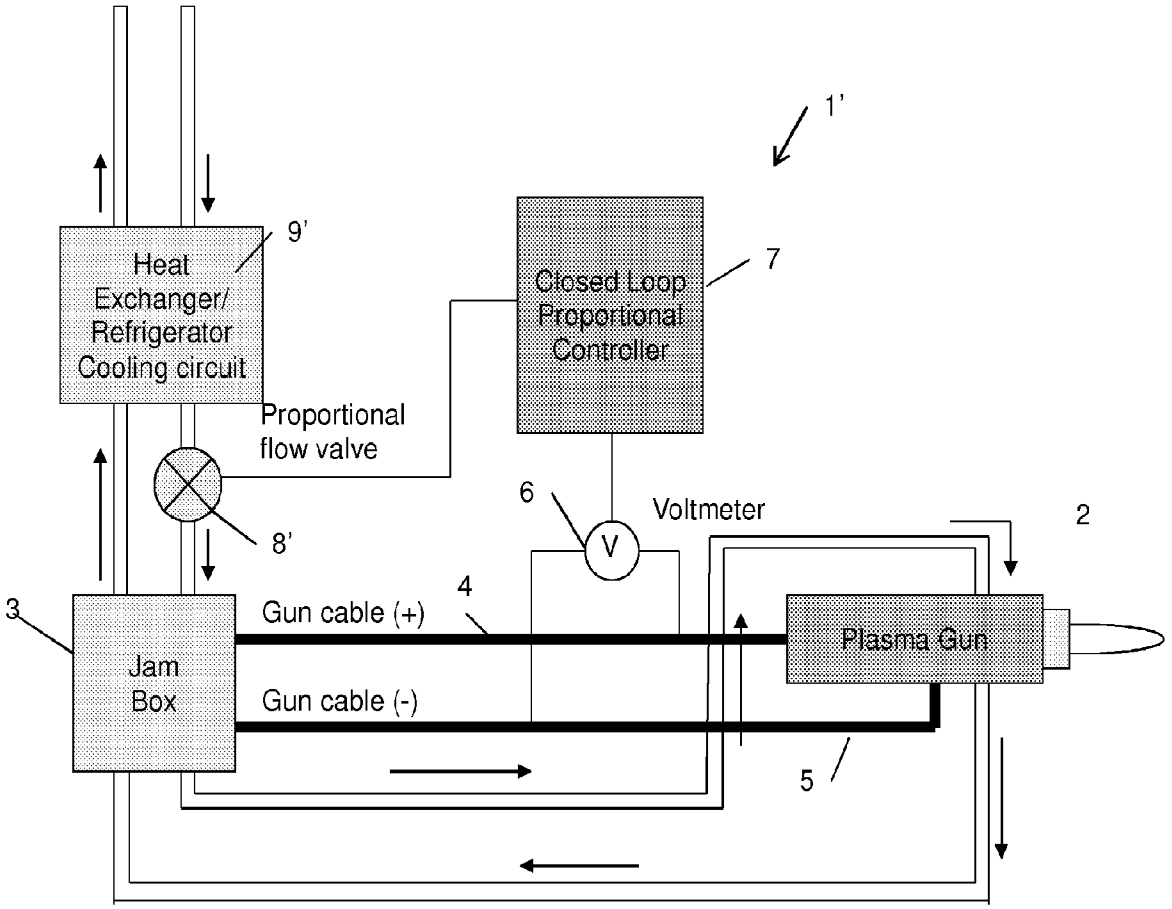
FIG. 4 illustrates another exemplary embodiment of a cooling water supply for a plasma gun.

In an alternate embodiment illustrated in FIG. 4, the gun voltage can be regulated by adjusting the cooling water flow to the plasma gun. This embodiment can be used for cooling circuits using a heat exchanger as well as those using a refrigerated cooling circuit connected directly to the gun. In accordance with this embodiment, in contrast to the structure shown in FIG. 3, proportional flow valve 8' is coupled between heat exchanger/refrigerated cooling circuit 9' and jam box 3. In operation, as the gun voltage drops during normal use, the control loop can adjust the cooling water flow to increase the gun temperature. In particular, proportional valve 8', positioned between heat exchanger/refrigerated cooling circuit 9' can be closed to reduce the cooling water flow. Thus, when controller 7 determines that the gun voltage (across gun cables 4 and 5) is decreasing, controller 7 controls proportional valve 8' to reduce the flow of cooling water out of heat exchanger/refrigerated cooling circuit 9', thereby decreasing the cooling water flow. This decreased cooling water flow is then supplied to jam box 3, and then to plasma gun 2 in manner discussed above with reference to FIG. 3. As a result of the adjusted cooling water flow to plasma gun 2, the temperature of plasma gun 2 increases to correspondingly increase the plasma gun voltage (see FIG. 2). As a result, hardware life, as measured by voltage drop, can be extended within the limits that the gun can withstand the higher operating temperatures before damage. These limits are fairly well known already and most control systems have them as part of the safety system.

While this alternate embodiment reducing the water flow also reduces the water pressure inside the gun, the boiling point of the water inside the plasma gun is also reduced. However, this embodiment has the advantage that the motor for the water pump driving the gun cooling circuit can be directly closed loop and as such the method is easily implemented for existing systems.

In still another embodiment, the above-noted embodiments can be combined so as to adjust the cooling water flow and to adjust the cooling water temperature to the gun. In this embodiment, a variable restriction is added to the outlet of the gun water circuit to maintain gun water pressure to avoid the issue of water boiling temperature. This pressure control would operate as a separate closed loop. By adjusting both the flow and temperature the maximum affect on gun voltage can be realized.

Other variations are possible to control the amount of gun cooling including but not limited to bypass circuits, resetting thermal controls on chillers to higher temperatures, etc.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A water cooling system for a plasma gun, comprising:
a water cooler structured and arranged to remove heat from cooling water to be supplied to the plasma gun;
a controller structured and arranged to monitor a gun voltage of the plasma gun in operation; and
at least one flow valve coupled to and under control of the controller to adjust a flow of the cooling water,
wherein, when the gun voltage of the plasma gun in operation drops below a predetermined value, the controller controls the at least one flow valve to increase a plasma gun temperature, which thereby increases the gun voltage.

2. The water cooling system in accordance with claim 1, wherein the water cooler comprises a heat exchanger and the at least one flow valve is arranged to adjust the cooling water flow supplied into the heat exchanger.

3. The water cooling system in accordance with claim 2, wherein the controller controls the at least one flow valve to increase the temperature of the plasma gun cooling water.

4. The water cooling system in accordance with claim 1, further comprising a jam box supplying power to the plasma gun via at least two gun cables,
wherein the jam box is arranged to receive the cooling water from the water cooler and the gun voltage is determined from the voltage between the gun cables at the jam box.

5. The water cooling system in accordance with claim 1, further comprising a device to measure the gun voltage of the plasma gun in operation.

6. The water cooling system in accordance with claim 1, wherein the water cooler comprises at least one of a heat exchanger or a refrigerated cooling circuit and the at least one flow valve is arranged to adjust the cooling water supplied out of the cooler.

7. The water cooling system in accordance with claim 6, wherein the controller controls the at least one flow valve to adjust the flow of cooling water from the cooler.

8. The water cooling system in accordance with claim 1, wherein the water cooler comprises a heat exchanger and the at least one flow valve comprises a first valve arranged to adjust the cooling water supplied to the heat exchanger and a second valve arranged to adjust the cooling water supplied out of the heat exchanger.

9. The water cooling system in accordance with claim 8, wherein the controller controls the first valve to increase the temperature of the cooling water and controls the second valve to decrease the flow of cooling water from the cooler.

10. The water cooling system in accordance with claim 1, wherein the controller controls the flow valve to at least one of increase the temperature of the cooling water and to decrease the flow of cooling water.

11. A method for operating a cooling system of a plasma gun, the method comprising:

monitoring a gun voltage of the plasma gun in operation; and when the gun voltage of the plasma gun in operation decreases to a predetermined value, adjusting a cooling water flow to the plasma gun in order to increase a gun temperature of the plasma gun.

12. The method in accordance with claim 11, wherein a heat exchanger is arranged to remove heat from the cooling water, and the method further includes adjusting the cooling water flow supplied into the heat exchanger.

13. The method in accordance with claim 12, wherein, because of the reduced cooling water flow, the heat exchanger increases the temperature of the cooling water.

14. The method in accordance with claim 11, wherein a jam box is arranged to supply power to the plasma gun via at least two gun cables, and the method includes determining the gun voltage of the plasma gun in operation from a voltage between the gun cables.

15. The method in accordance with claim 11, wherein a voltage device determines, at the plasma gun, the gun voltage of the plasma gun in operation.

16. The method in accordance with claim 11, wherein a water cooler comprising at least one of a heat exchanger and a refrigerated cooling circuit is arranged to remove heat from the cooling water, and the method further includes adjusting the flow of the cooling water supplied out of the cooler.

17. The method in accordance with claim 11, wherein a heat exchanger is arranged to remove heat from the cooling water, the method further includes adjusting the cooling water supplied to the heat exchanger and adjusting the cooling water supplied out of the heat exchanger.

18. The method in accordance with claim 17, wherein the adjusting of the cooling water supplied to the heat exchanger increases the temperature of the cooling water and the adjusting of the cooling water supplied out of the heat exchanger decreases the flow of cooling water from the cooler.

19. The method in accordance with claim 11, wherein the adjusting of the cooling water flow results in at least one of increasing the temperature of the cooling water and decreasing the flow of cooling water.

20. The method in accordance with claim 11, whereby the increased gun temperature increases the gun voltage of the plasma gun in operation.

21. A method for increasing service life of a plasma gun, the method comprising:

monitoring a gun voltage of the plasma gun in operation; and adjusting a cooling water flow to the plasma gun, whereby a gun voltage of the plasma gun in operation is increased.

22. The method in accordance with claim 21, wherein the adjusting of the cooling water increases a gun temperature of the plasma gun.

* * * * *